United States Patent
Hsueh et al.

(10) Patent No.: US 9,496,819 B2
(45) Date of Patent: Nov. 15, 2016

(54) WATERTIGHT ROOF ASSEMBLY INTEGRATED WITH SOLAR PANELS

(71) Applicant: Lien-Feng Hsueh, Tainan (TW)

(72) Inventors: Lien-Feng Hsueh, Tainan (TW); Min-Lang Wang, Tainan (TW)

(73) Assignee: Lien-Feng Hsueh, Tainan (TW)

( * ) Notice: Subject to any disclaimer, the term of this patent is extended or adjusted under 35 U.S.C. 154(b) by 26 days.

(21) Appl. No.: 14/520,718

(22) Filed: Oct. 22, 2014

(65) Prior Publication Data

US 2016/0043686 A1    Feb. 11, 2016

(30) Foreign Application Priority Data

Aug. 5, 2014    (TW) .............................. 103126732 A (51) Int. Cl.
| | | |
|---|---|---|
| *H02S 20/23* | (2014.01) | |
| *H02S 30/10* | (2014.01) | |
| *E04D 11/00* | (2006.01) | |
| *E04D 13/04* | (2006.01) | |
| *E04D 13/15* | (2006.01) | |

(52) U.S. Cl.
CPC ............. *H02S 20/23* (2014.12); *E04D 11/005* (2013.01); *E04D 13/04* (2013.01); *E04D 13/15* (2013.01); *H02S 30/10* (2014.12)

(58) Field of Classification Search
CPC ....... H02S 20/23; H02S 30/10; E04D 13/04; E04D 11/005; E04D 13/15
USPC .............. 52/173.3, 582.1, 584.1, 578, 653.1, 52/656.1, 745.19, 747.1, 60; 248/237, 248/346.01, 910; 126/704, 623; 136/244, 136/230, 251
See application file for complete search history.

(56) References Cited

U.S. PATENT DOCUMENTS

| | | | | |
|---|---|---|---|---|
| 3,443,350 A | * | 5/1969 | Birum, Jr. ............... | E04B 2/967 52/459 |
| 4,239,555 A | * | 12/1980 | Scharlack ............ | H01L 31/048 136/251 |
| 6,105,317 A | * | 8/2000 | Tomiuchi .................. | E04D 3/08 52/173.3 |
| 6,672,018 B2 | * | 1/2004 | Shingleton ............. | F24J 2/5205 126/621 |
| 7,434,362 B2 | * | 10/2008 | Liebendorfer ......... | F24J 2/5205 136/244 |
| 2003/0094193 A1 | * | 5/2003 | Mapes .................... | F24J 2/5207 136/244 |
| 2003/0101662 A1 | * | 6/2003 | Ullman ................... | E04D 13/12 52/27 |
| 2006/0086382 A1 | * | 4/2006 | Plaisted ................. | F24J 2/5207 136/244 |
| 2008/0000173 A1 | * | 1/2008 | Lenox .................... | F24J 2/5245 52/173.1 |

(Continued)

FOREIGN PATENT DOCUMENTS

TW           M464492         11/2013

*Primary Examiner* — Babajide Demuren
(74) *Attorney, Agent, or Firm* — Muncy, Geissler, Olds & Lowe, P.C.

(57) ABSTRACT

A watertight roof assembly integrated with solar panels to construct a roof of a building includes a plurality of support units spaced from each other, a plurality of solar modules straddled two neighboring support units, a plurality of fixture units and a plurality of waterproof units corresponding respectively to one solar module. Each support unit includes two bearing planes and a plurality of holding racks located between the two bearing planes. Each solar module has two sides leaned respectively on one of the abutting bearing planes of the two support units. Each fixture unit has a connecting portion, an extension and a press portion. Each waterproof unit has a first press strip and a second press strip.

8 Claims, 11 Drawing Sheets

(56) References Cited

U.S. PATENT DOCUMENTS

| | | | | |
|---|---|---|---|---|
| 2008/0087320 A1* | 4/2008 | Mapes | ............ | F24J 2/5207 136/244 |
| 2010/0275549 A1* | 11/2010 | Bruce | ............ | F24J 2/5205 52/698 |
| 2010/0276558 A1* | 11/2010 | Faust | ............ | F24J 2/5205 248/222.14 |
| 2011/0174947 A1* | 7/2011 | Wu | ............ | F24J 2/5205 248/226.11 |
| 2011/0260027 A1* | 10/2011 | Farnham, Jr. | ............ | F24J 2/5207 248/309.1 |

* cited by examiner

WATERTIGHT ROOF ASSEMBLY INTEGRATED WITH SOLAR PANELS

FIELD OF THE INVENTION

The present invention relates to a watertight roof assembly integrated with solar panels and particularly to a watertight roof assembly integrated with solar panels that provides improved watertight efficacy and also solar power generation.

BACKGROUND OF THE INVENTION

In recent years environmental protection awareness is growing worldwide. How to rationally exploit reusable green energy has become an important issue. Solar power generation is the mostly focused topic. At present the most commonly seen solar power generation approach is installing solar panels on the idle areas of the roof top of buildings to transform light energy via photoelectric semiconductors to electric power and store it for further utilization, thereby save energy resources. More specifically, the conventional method of installing the solar panels is first, installing scaffolding on the roof top to form grilles on the top of the scaffolding, then wedging the solar panels in the grilles. However, during raining rainwater often seeps through the crevices between the solar panels and the scaffolding to the roof top floor, and the scaffolding also could rust due to oxidation after a period of time and has to be repaired that could mean dismantling and replacing the original scaffolding. It is time consuming and also wastes a lot of building materials.

Taiwan patent No. M464492 discloses a solar panel watertight scaffolding which mainly includes a scaffolding consisted of a plurality of steel brackets to form a plurality of grid apertures on the top surface of the scaffolding to allow a plurality of solar panels laid thereon. A watertight spaced layer made of a waterproof laminate is provided below the solar panels to prevent seeping and leaking of rainwater.

However, the aforesaid technique requires a large size of waterproof spaced layer to mate the scaffolding that covers the entire roof top surface. Since the waterproof spaced layer is a flat sheet and difficult to maintain flatness as the size of the working piece becomes bigger, it is more difficult in construction. Moreover, after finish, and the scaffolding has been subject to sunshine and raining for a period of time, the waterproof spaced layer tends to warp and deform. Hence it has to be inspected periodically, and the damaged portion has to be removed and replaced. All this indirectly increases the cost of the solar panel installation. On the other hand, as the conventional solar panel scaffolding has to be built on the roof top of the building, if the roof top originally has skylight or other lighting means located thereon, installation of the waterproof spaced layer masks the original lighting function. In addition, the waterproof effect it provided merely preventing rainwater from falling to the roof top. Hence the aforesaid technique still has room for improvement.

SUMMARY OF THE INVENTION

The primary object of the present invention is to solve the problem of the conventional technique of using large size flat sheet working pieces that easily warp and deform and create difficulty in construction and also are inferior in waterproof efficacy.

To achieve the foregoing object the present invention provides a watertight roof assembly integrated with solar panels to construct the roof of a building. It includes a plurality of support units located on the roof of the building in a spaced manner, a plurality of solar modules, a plurality of fixture units, and a plurality of waterproof units corresponding each solar module. Each support unit includes two bearing planes at one side remote from the building and a plurality of holding racks located between the two bearing planes. Each solar module straddles two neighboring support units and has two sides leaned respectively on one of the abutting bearing planes of the two support units. Each fixture unit has a connecting portion connected to one holding rack, an extension extended along one edge of the solar module to the top surface thereof, and a press portion extended from the extension toward the top surface of the solar module to press the solar module. Each waterproof unit has a first press strip clamped between the fixture units and the solar modules and a second press strip located between each solar module and each bearing plane.

In one aspect each support unit includes two support racks corresponding to one of the bearing planes, and each support rack has a bearing panel to form the bearing plane, and a connection panel extended from the bearing panel to the building. Each holding rack bridges the two connection panels of the two support racks.

In another aspect each support rack has a holding panel extended from one connection panel to another connection panel, and the watertight roof assembly of the invention further includes a roof panel located between the two holding panels of the two support racks.

In yet another aspect the roof panel is made of glass or transparent acrylic.

In yet another aspect the watertight roof assembly further includes a plurality of waterproof and vibration-resistant connection strips to encase distal ends of the holding panel, and the roof panel leans on the waterproof and vibration-resistant connection strips.

In yet another aspect each support unit includes a support rack which has two bearing panels corresponding to the two bearing planes, two connection panels extended respectively from the two bearing panels toward the building, and a shielding panel to bridge the connection panels.

In yet another aspect each second press strip encases the distal end of the bearing panel corresponding to the bearing plane.

In yet another aspect each solar module includes a plurality of solar panels laid in an array fashion. Each solar panel has a photoelectric conversion unit and an outer frame surrounding the photoelectric conversion unit. Each outer frame has a protruding portion at one side abutting another solar panel. The watertight roof assembly further includes a plurality of water barrier strips located between two neighboring protruding portions and a plurality of connection members to cover the two neighboring protruding portions.

In yet another aspect each outer frame has a lateral frame side in contact with the first press strip after assembly, and a water barrier section extended along the lateral frame side toward the support unit.

In yet another aspect each connecting portion has a connection hole, and each holding rack has an anchor hole corresponding to the connection hole, and the watertight roof assembly further includes a plurality of fasteners run through respectively each connection hole and each anchor hole to fasten the connecting portion to the holding rack.

Thus, compared with the previous technique, the invention provides many advantages, notably:

1. The watertight roof assembly integrated with solar panels of the invention provides waterproof efficacy, and can directly serve as the roof of a building, and also can generate solar power.

2. The invention is formed by assembly of multiple working pieces, hence can be constructed or replaced locally during installation or repairs. Compared with the conventional technique of laying a large size of spaced layer, the invention is simpler in construction. In addition, aside from the solar panels, other light permeable roof panels such as glass or acrylic also can be incorporated, hence is suitable for farmhouses, greenhouses, or ordinary houses to meet lighting requirement.

The foregoing, as well as additional objects, features and advantages of the invention will be more readily apparent from the following embodiments and detailed description, which proceed with reference to the accompanying drawings. The drawings aim to facilitate discussion and are not necessary made in actual proportions, hence also are not to limit the claims of the invention.

DETAILED DESCRIPTION OF THE PREFERRED EMBODIMENTS

Figure 1:
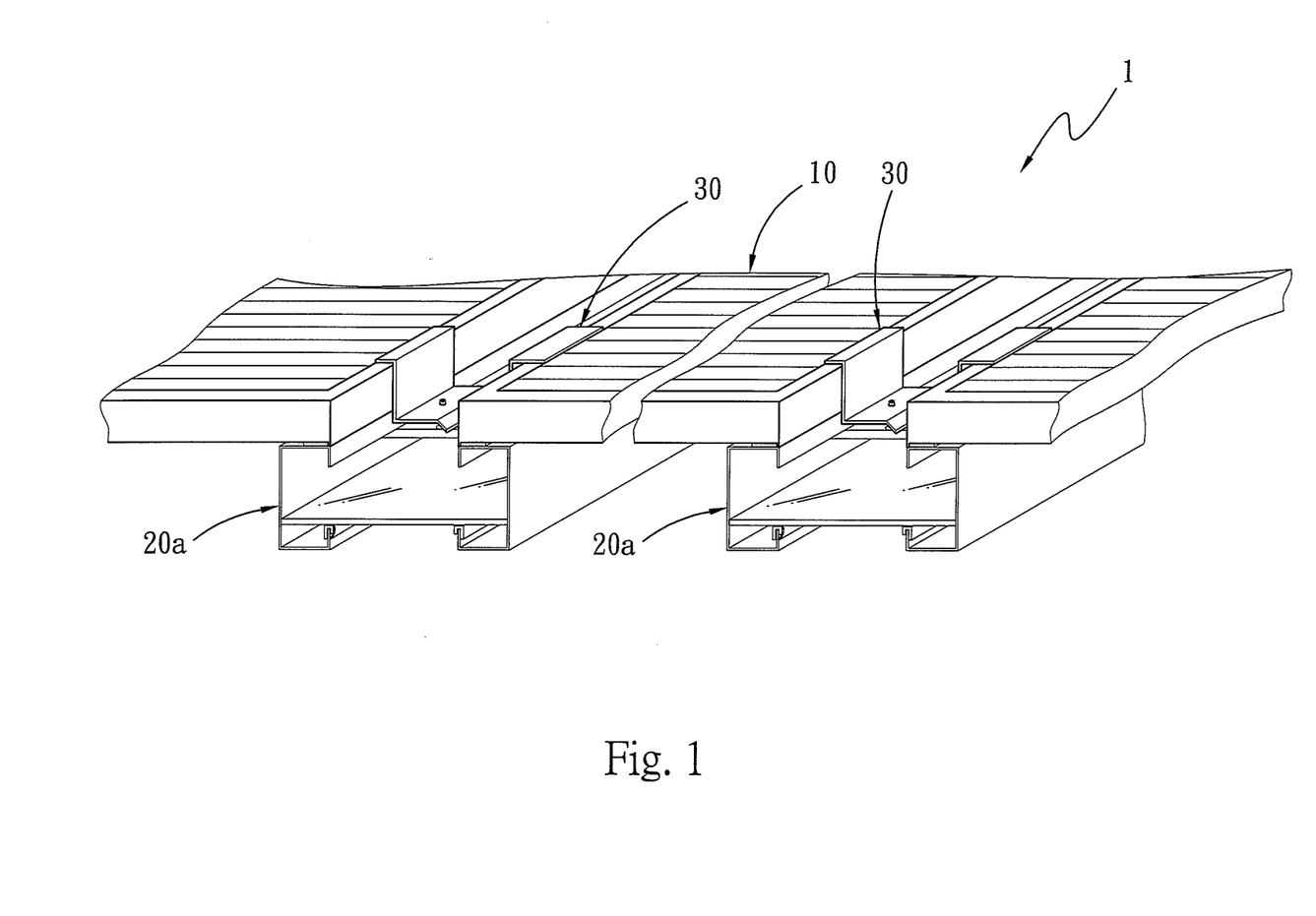
FIG. 1 is a perspective view of a first embodiment of the invention.
Figure 2:
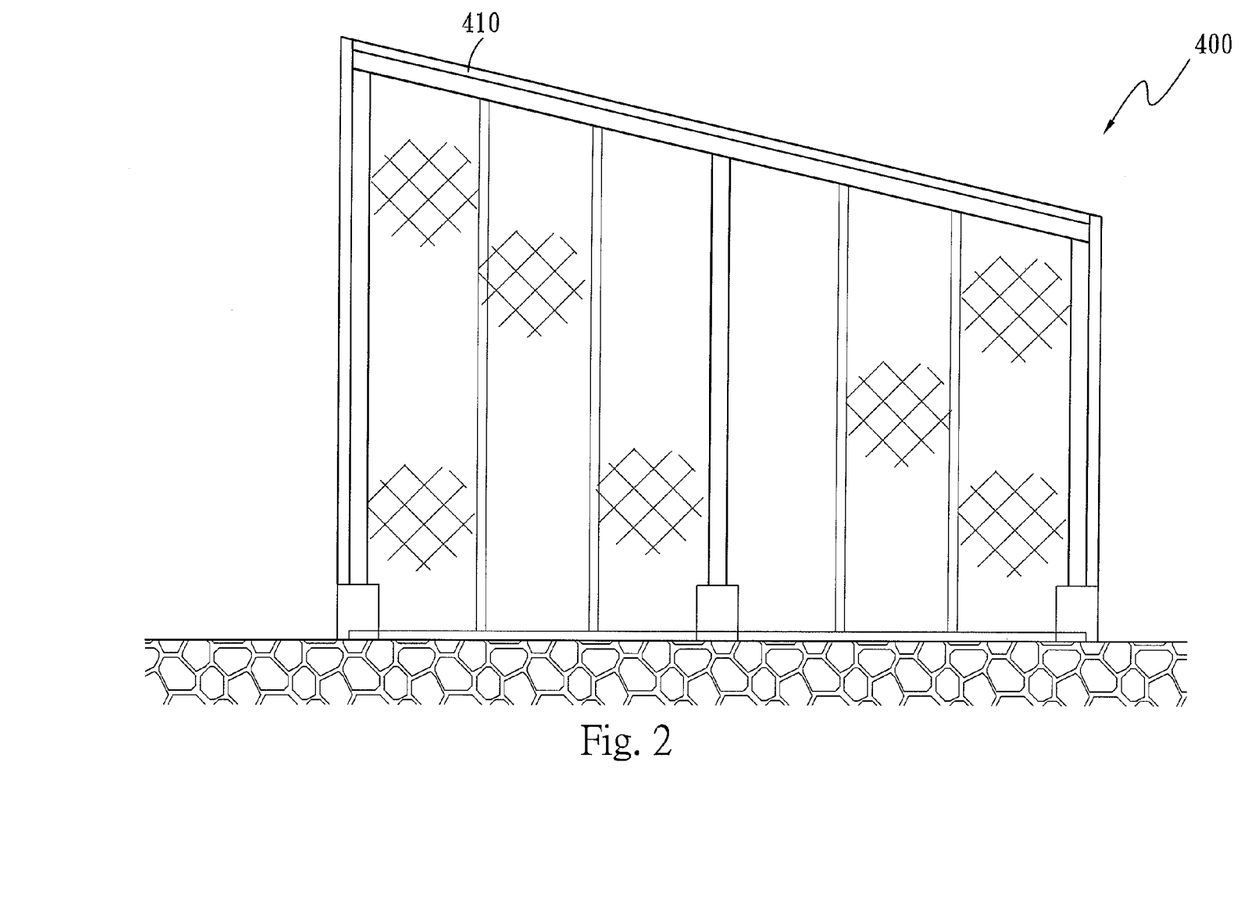
FIG. 2 is a schematic view of the roof assembly of the invention and a building in use.

Please referring to FIGS. 1 and 2, the present invention aims to provide a watertight roof assembly 1 integrated with solar panels to be used to construct a roof 410 of a building 400, such as a farmhouse, a greenhouse, an ordinary house or the like. The roof 410, aside from providing shelter for the building 400 to fend off rainwater, also can provide solar power generation. The watertight roof assembly 1 includes a plurality of support units 20a located on the roof 410 and spaced from each other, a plurality of solar modules 10, a plurality of fixture units 30, and a plurality of waterproof units 40 (also referring to FIG. 4). It is to be noted that in the drawings the solar modules 10 are shown horizontally, however when in actual use on the roof 410 they could consist of a sloped plane, a flat plane or multiple planes formed in various angles without restriction.

Figure 3A:
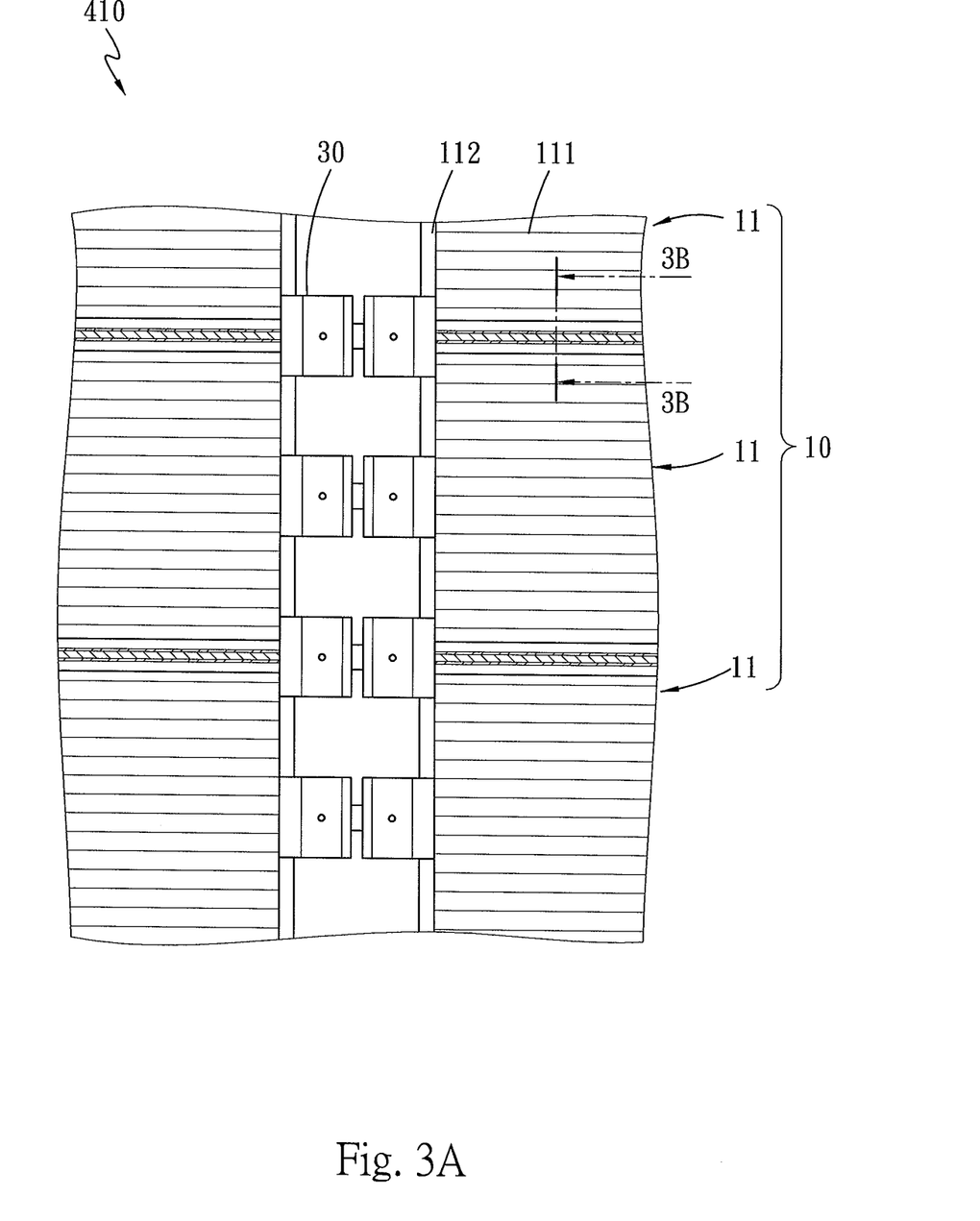
FIG. 3A is a plane view of the roof of the invention.
Figure 3B:
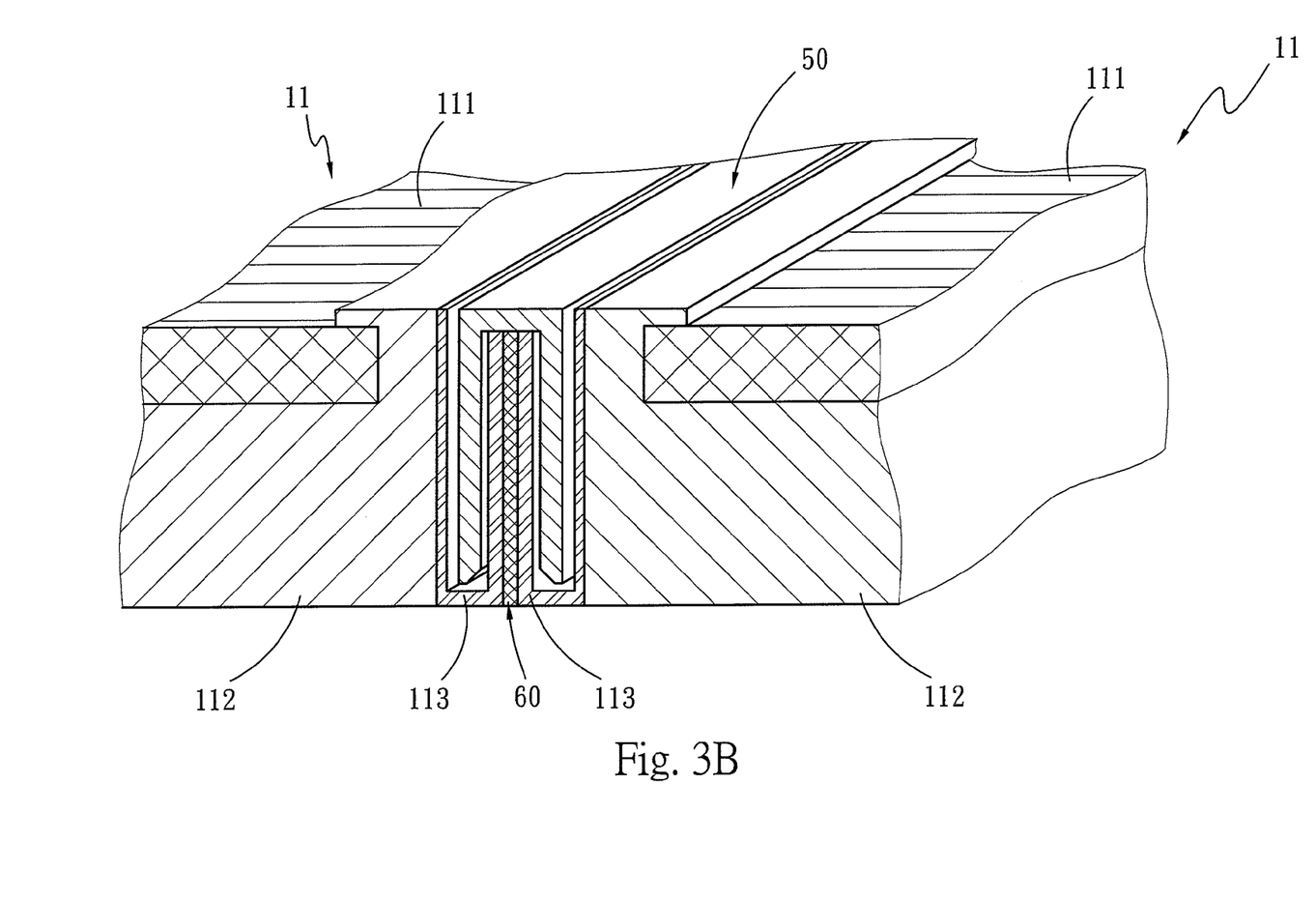
FIG. 3B is a cross sectional view taken on line 3B-3B in FIG. 3A.

Also referring to FIGS. 3A and 3B, more specifically, each solar module 10 includes a plurality of solar panels 11 laid in an array fashion. Each solar panel 11 has a photoelectric conversion unit 111 and an outer frame 112 surrounding the photoelectric conversion unit 111. Each outer frame 112 has a protruding portion 113 at one side abutting another solar panel 11. The watertight roof assembly 1 further includes a plurality of water barrier strips 60 between two neighboring protruding portions 113, and a plurality of connection members 50 to cover the two neighboring protruding portions 113. In one embodiment the photoelectric conversion unit 111 is formed by coupling a plurality of photoelectric diodes embedded with electrodes to convert received light energy to electric energy. The connection members 50 can be an aluminum extrusion member, and the water barrier strip 60 can be a rubber strip. The connection members 50 and the water barrier strip 60 have their surfaces coated with waterproof rubber paint. Hence two neighboring solar panels 11 can be coupled with each other via one connection member 50 and the protruding portions 113 to tightly clamp the water barrier strip 60 to fully seal a gap formed between the two neighboring solar panels 11 to prevent rainwater from seeping between the two neighboring solar panels 11 into the building 400.

Figure 4:
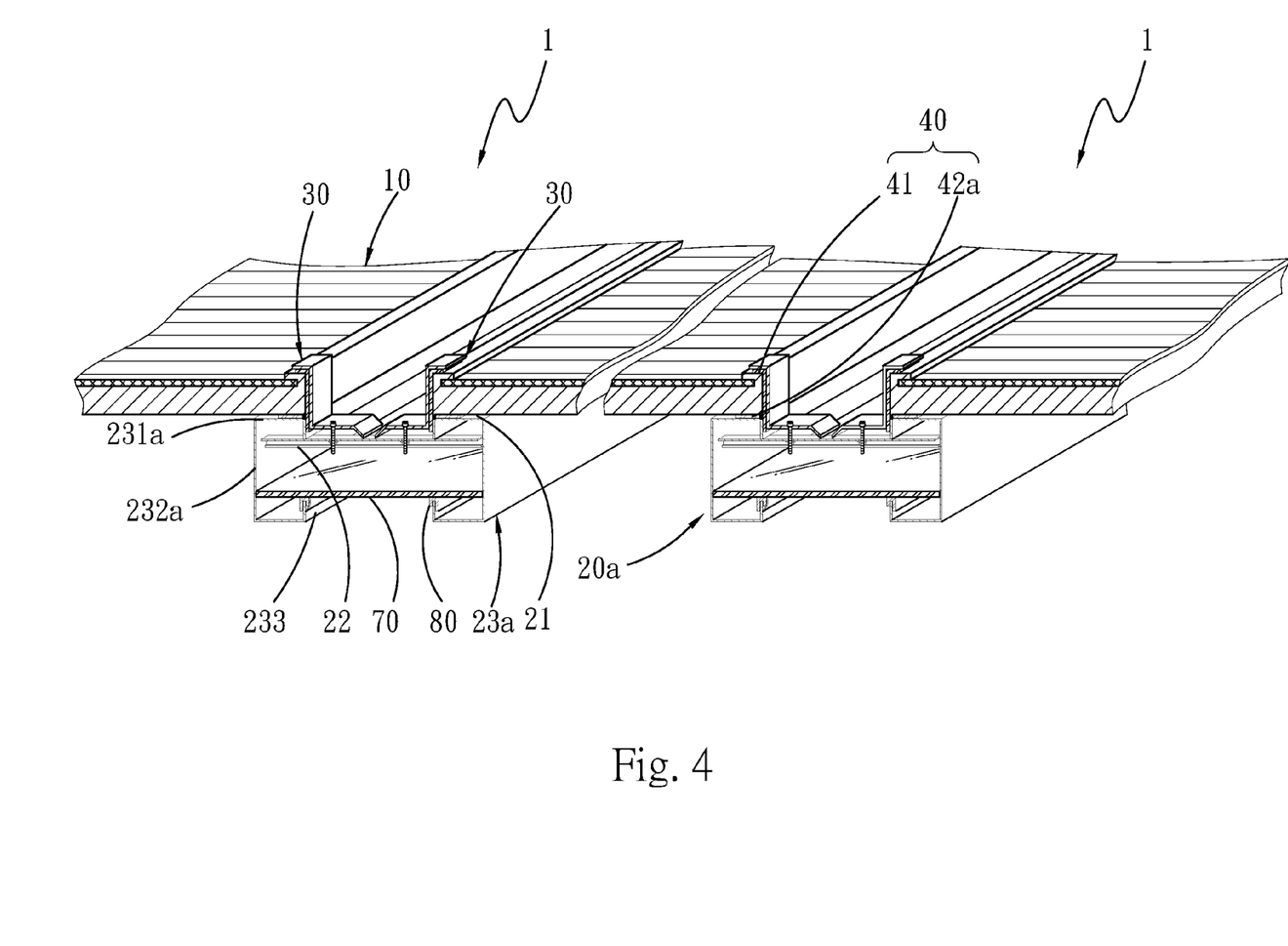
FIG. 4 is a sectional view of a first embodiment of the invention.
Figure 5:
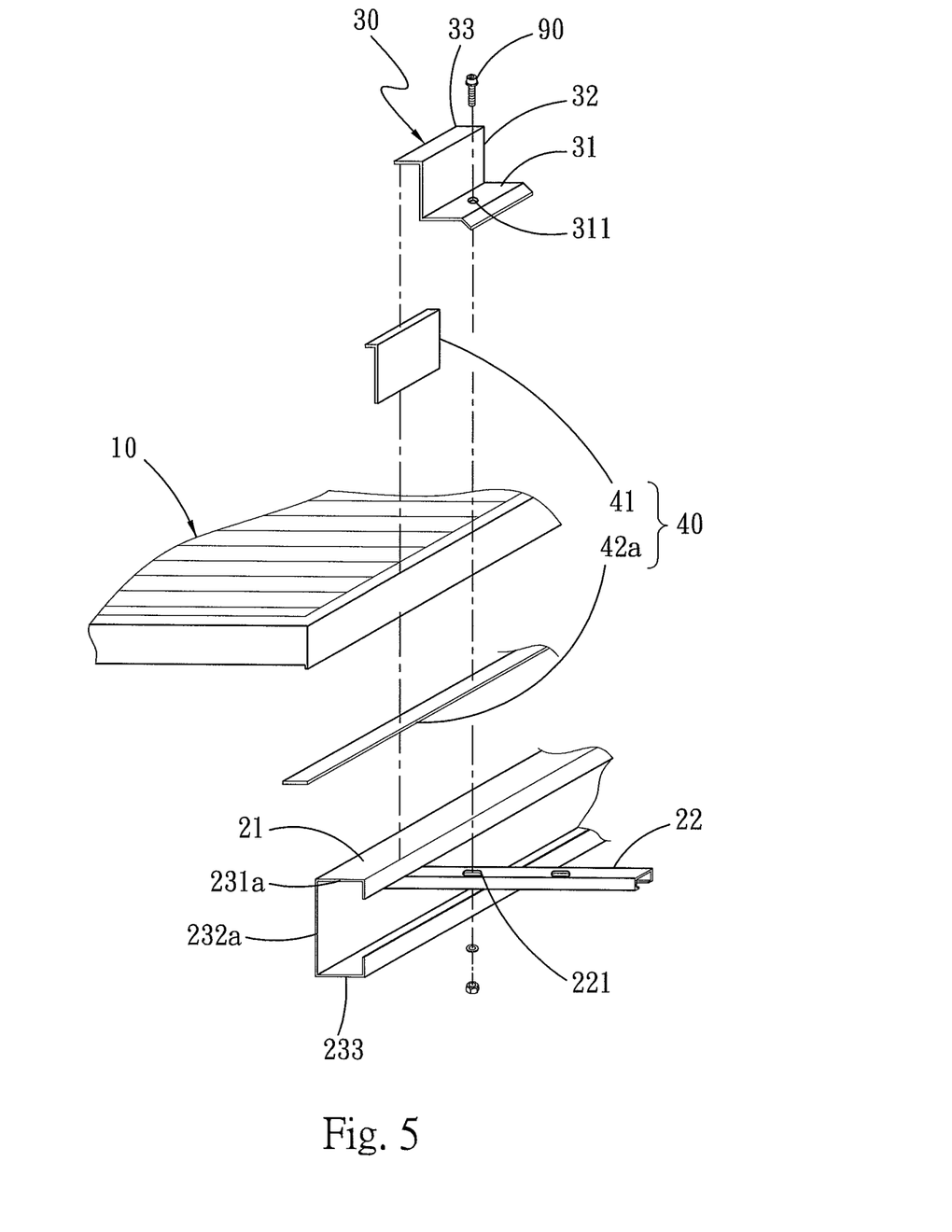
FIG. 5 is an exploded view of the first embodiment of the invention.

Please referring to FIGS. 4 and 5, each support unit 20a includes two bearing planes 21 at one side remote from the building 400, and a plurality of holding racks 22 located between the two bearing planes 21. Each solar panel 10 straddles two neighboring support units 21. Moreover, the solar panel 10 has two sides leaned respectively on one of the two neighboring bearing planes 21 of the support units 20a. In this embodiment each support unit 20a includes two support racks 23a corresponding to one bearing plane 21, and each support rack 23a has a bearing panel 231a with the bearing plane 21 formed thereon and a connection panel 232a extended from the bearing panel 21 toward the building 400. Each holding rack 22 bridges two connection panels 232a of the two support racks 20a. In addition, each support rack 23a has a holding panel 233 extended from the connection panel 232a toward another connection panel 232a. The watertight roof assembly 1 further includes a roof panel 70 to bridge the two holding panels 233. Each support rack 23a can be a C type steel available on the market, and has two wings to serve as the bearing panel 231a and the holding panel 233. The roof panel 70 can be made of light permeable material such as glass or transparent acrylic, and spaced from the solar modules 10, therefore can be used for lighting of houses, greenhouses or farmhouses. In addition, to prevent rainwater from seeping through the gap between the roof panel 70 and holding panel 233, and also prevent friction from generating between the roof panel 70 and the holding panel 233 in the event of earthquake, the watertight roof assembly 1 further includes a plurality of waterproof and vibration-resistant connection strips 80 to cover distal ends of each holding panel 233, and also be interposed between the holding panel 233 and the roof panel 70. The waterproof and vibration-resistant connection strips 80 are made from rubber to provide waterproof and vibration damping effect.

Figure 8:
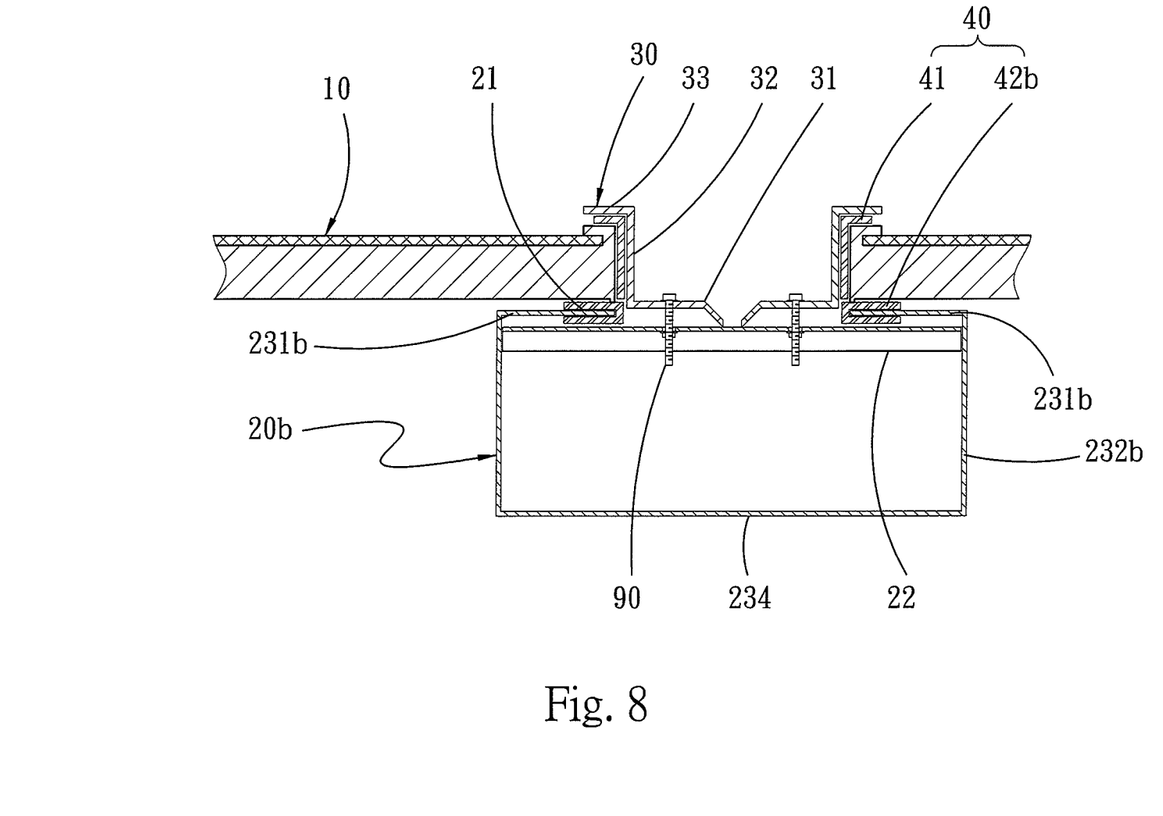
FIG. 8 is a sectional view of a second embodiment of the invention.

Please refer to FIG. 8 for a second embodiment of the invention. Each support unit 20b includes a support rack 23b which has two bearing panels 231b corresponding to the two bearing planes 21, two connection panels 232b extended respectively from the two bearing panels 21 toward the building 400, and a shielding panel 234 to bridge the connection panels 232b. In this embodiment the support unit 20b can be a single C type steel. By covering the roof 410 with the shielding panel 234 rainwater does not seep into the building 400, hence simplifies the structure of the watertight roof assembly 1 of the invention. While the roof panel 70 in first embodiment (referring to FIG. 4) is made from light permeable material such as glass or the like, in the second embodiment the connection panels 232b are an opaque steel frame, hence the first embodiment and the second embodiment can be used at the same time to construct the roof 410 (referring to FIG. 3B) to adjust lighting of the building 400. In addition, in this embodiment a second press strip 42b encases the distal end of the bearing panel 231b corresponding to the bearing plane 21 to fill the gap between the bearing panel 231b and the solar module 10 to fully prevent rainwater from seeping in.

Figure 6A:
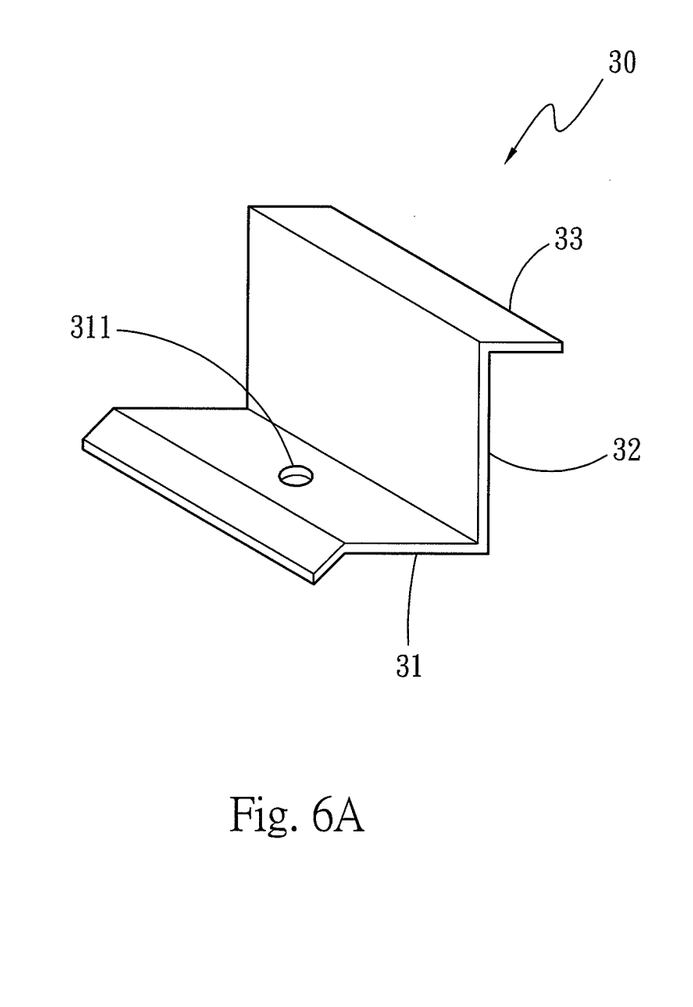
FIG. 6A is a perspective view of a fixture unit of the invention.
Figure 6B:
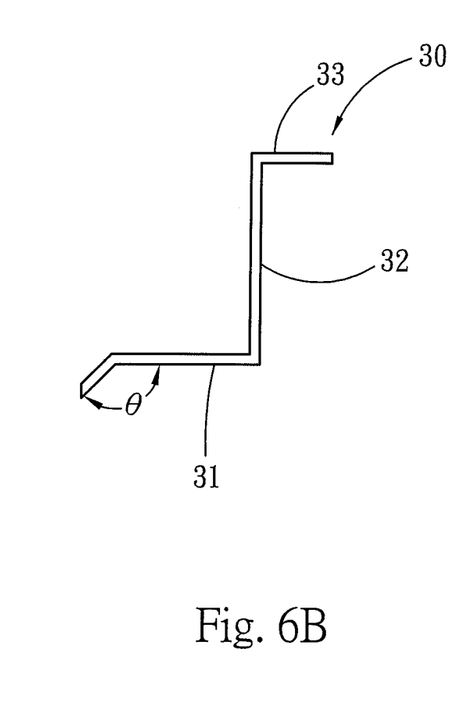
FIG. 6B is a plane view of a fixture unit of the invention.

Please referring to FIGS. 5 and 6A, each fixture unit 30 has a connecting portion 31 connected to one holding rack, an extension 32 extended along the edge of the solar module 10 to the top surface of the solar module 10, and a press portion 33 extended from the extension 32 toward the top surface of the solar module 10 to press thereon. Thus, each fixture unit 30 can press and hold the solar module 10 on the bearing plane 21 through the press portion 33. In this embodiment each connecting portion 31 has a connection hole 311, and each holding rack 22 has an anchor hole 221 corresponding to the connection hole 311. The watertight roof assembly 1 further includes a plurality of fasteners 90 such as screws to run through respectively each connection hole 311 and each anchor hole 221 to fasten the connecting portion 31 and the holding rack 22 together. In addition, as show in FIG. 6B, each connecting portion 31 has a bend angle θ ranged from 125.degree. to 145.degree. to absorb stress generated by fastening of the connecting portion 31 to the holding rack 22, or prevent loosening of the fasteners 90 caused by twisting of the connecting portion 31 resulted from factors such as blowing of strong wind.

Please referring to FIGS. 4 and 5, each waterproof unit 40 has a first press strip 41 clamped between the fixture unit 30 and the solar module 10, and the second press strip 42a located between each solar module 10 and each bearing plane 21. The first press strip 41 and the second press strip 42a can be made from rubber, or an aluminum extrusion working piece coated with rubber paint. The waterproof unit 40 can prevent rainwater from seeping through a gap formed between the fixture unit 30 and the solar module 10, or crevices formed between the solar module 10 and the bearing plane 21, thereby to fully achieve waterproof effect.

Figure 7A:
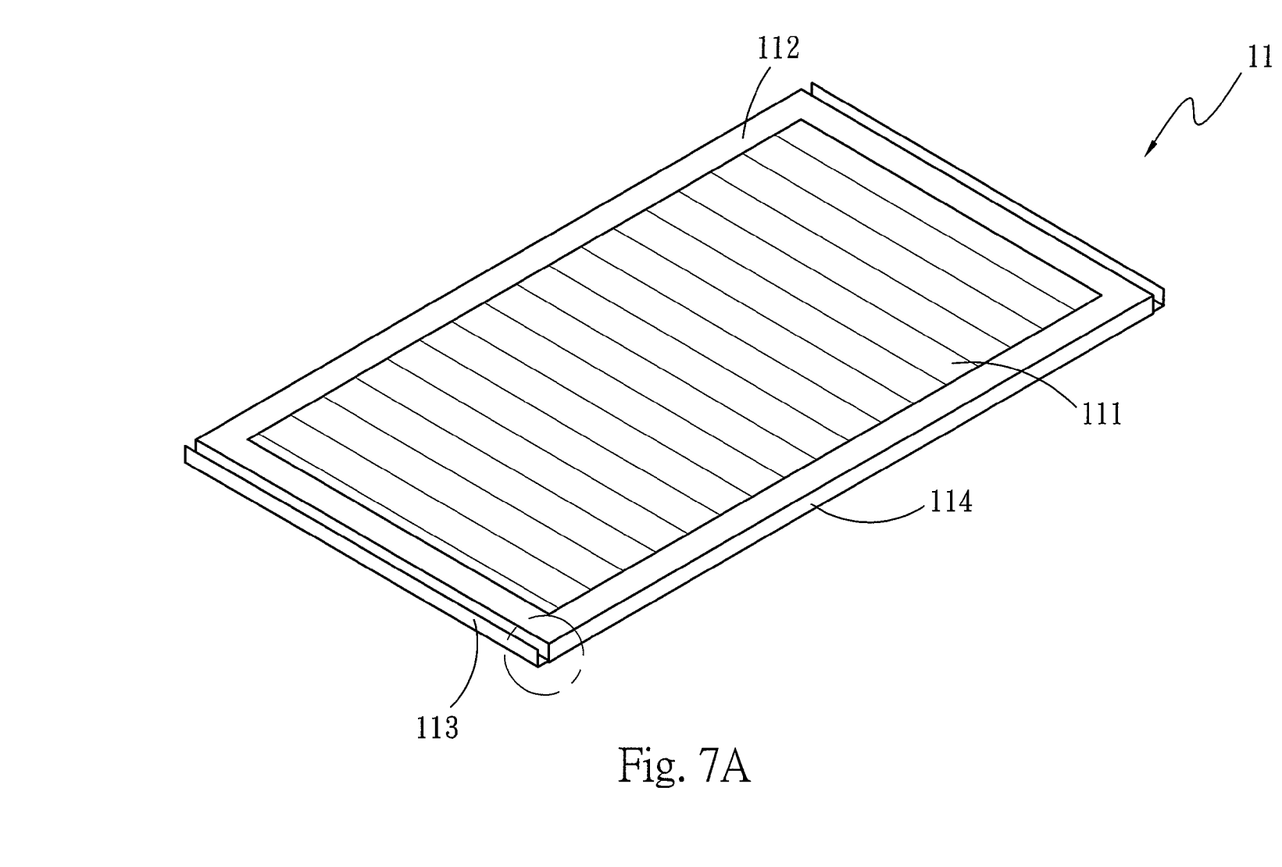
FIG. 7A is a perspective view of a solar panel of the invention.
Figure 7B:
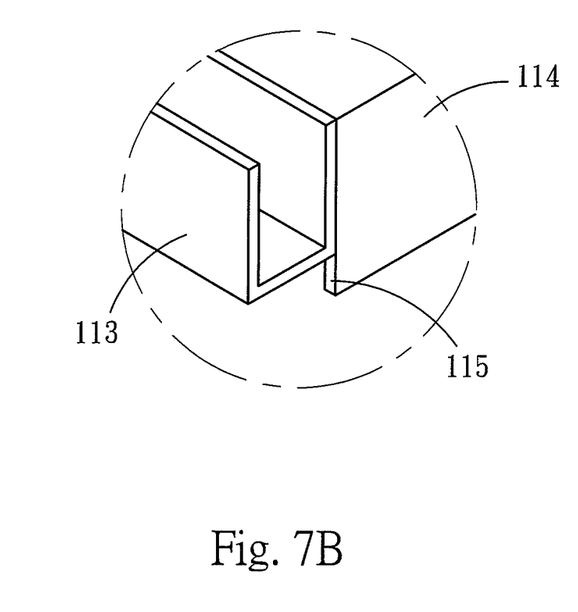
FIG. 7B is a fragmentary enlarged view according to FIG. 7A.

Furthermore, considering that rainwater could seep into the building 400 through the connecting crevices between the solar panels 11, referring to FIGS. 7A and 7B, in one embodiment each outer frame 112 has a lateral frame side 114 in contact with the first press strip 41 after installation (referring to FIG. 5), and water barrier section 115 extended along the lateral frame side 114 toward the support unit 20. The water barrier section 115 is extended from the lateral frame side 114 toward the interior of the building, so that even if the rainwater seeps between the first press strip 41 and the support unit 20a (referring to FIG. 4), it still is blocked by the water barrier section 115 and flows via the support rack 21 and discharges through the watertight roof assembly 1 without seeping into the interior of the building.

Figure 9:
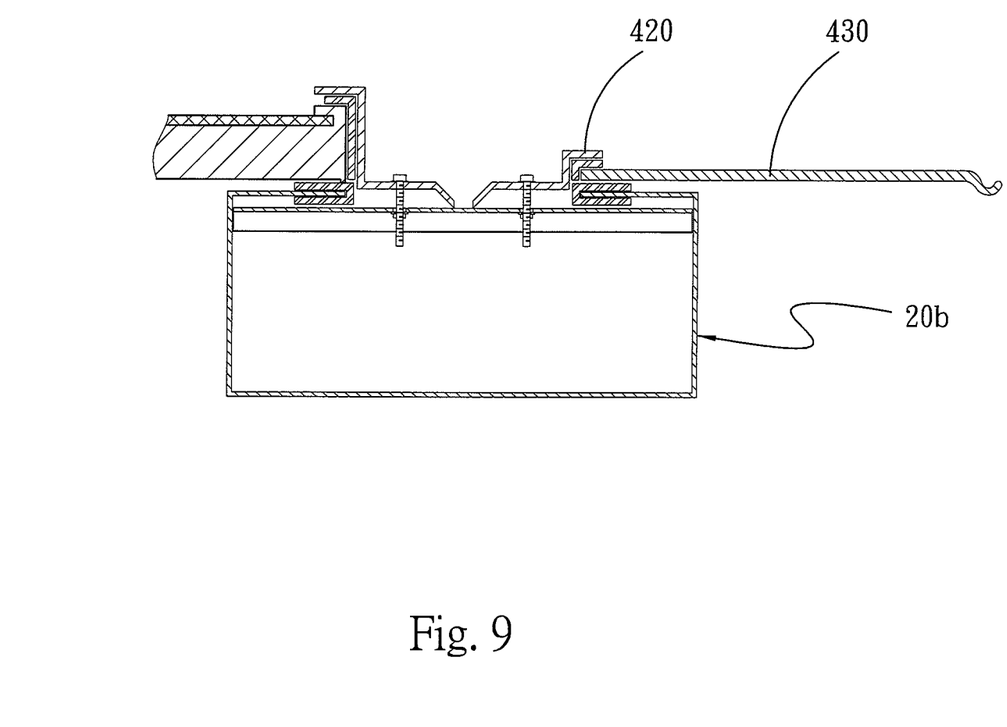
FIG. 9 is a sectional view of an ornamental panel of the invention in a use condition.

Moreover, the distal end of the roof 410 of the watertight roof assembly 1 can be made from ordinary building material according to requirements. Also referring to FIG. 9, at the edge of the watertight roof assembly 1 a plurality of clamping sheets 420b can be provided to collaborate with the support unit 20b to clamp an ornamental panel 430 which can be a corrugated sheet, a rock wool sheet or other building materials to decorate the appearance of the building 400.

As a conclusion, the watertight roof assembly integrated with solar panels of the invention can clamp and hold the solar module through the support unit and the fixture unit, hence can provide improvement to resolve the problem of the conventional technique of using a single large size waterproof spaced layer that makes assembly, disassembly and repairs difficult, and also can reduce the cost of installing the solar panels on the roof of the building. In addition, by deploying the waterproof units in the joining gaps formed between the solar module, the support unit and the fixture unit, rainwater can be prevented from seeping into the building. As a result, the invention, in addition to be used for constructing the roof, also can generate electric power through solar energy.

What is claimed is:

1. A watertight roof assembly integrated with solar panels used to construct a roof of a building, comprising:
a plurality of support units located on the roof in a spaced manner, each support unit including two bearing planes at one side remote from the building and a plurality of holding racks between the two bearing planes;
a plurality of solar modules each straddles two neighboring support units and has two sides leaned respectively on one of the abutting bearing planes;
a plurality of fixture units each includes a connecting portion connected to one of the holding racks, an extension extended along an edge of the solar module toward the top surface of the solar module, and a press portion extended toward the top surface of the solar module to press the solar module; and a plurality of waterproof units corresponding respectively to one of the solar modules, each waterproof unit including a first press strip clamped between the fixture units and the solar modules, and a second press strip located between each solar module and each bearing plane,
wherein each support unit includes two support racks corresponding to one of the bearing planes, each support rack including a bearing panel which forms the bearing planes, and a connection panel extended from the bearing panel toward the building, each holding rack bridging the two connection panels of the two support racks, and
wherein each support rack includes a holding panel extended from one connection panel toward another connection panel, and the watertight roof assembly further includes a roof panel located between the two holding panels of the two support racks.

2. The watertight roof assembly of claim 1, wherein the roof panel is made of glass or transparent acrylic.

3. The watertight roof assembly of claim 1 further including a plurality of waterproof and vibration-resistant connection strips to cover respectively distal ends of the holding panels, the roof panel leaning on the waterproof and vibration-resistant connection strips.

4. The watertight roof assembly of claim 1, wherein each support unit includes a support rack which includes two bearing panels corresponding to the two bearing planes, two connection panels extended from the two bearing panels toward the building, and a shielding panel to bridge the connection panels.

5. The watertight roof assembly of claim 4, wherein each second press strip encases distal ends of the bearing panels corresponding to the bearing planes.

6. The watertight roof assembly of claim 1, wherein each solar module includes a plurality of solar panels laid in an array fashion, each solar panel including a photoelectric conversion unit and an outer frame surrounding the photoelectric conversion unit, each outer frame including a protruding portion at one side abutting another solar panel, the watertight roof assembly further including a plurality of water barrier strips located between two neighboring protruding portions and a plurality of connection members to cover the two abutting protruding portions.

7. The watertight roof assembly of claim 6, wherein each outer frame includes a lateral frame side in contact with the first press strip after assembly and a water barrier section extended along the lateral frame side toward the support unit.

8. The watertight roof assembly of claim 1, wherein each connecting portion includes a connection hole, and each holding rack includes an anchor hole corresponding to the connection hole, and the watertight roof assembly further includes a plurality of fasteners run through respectively each connection hole and each anchor hole to fasten the connecting portion and the holding rack together.

\* \* \* \* \*